# (12) United States Patent
Cho et al.

(10) Patent No.: US 7,852,523 B2
(45) Date of Patent: Dec. 14, 2010

(54) SCANNER MODULE AND IMAGE SCANNING APPARATUS EMPLOYING THE SAME

(75) Inventors: Jung Hyuck Cho, Seoul (KR); Kyung Rok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 12/170,935

(22) Filed: Jul. 10, 2008

(65) Prior Publication Data

US 2009/0015884 A1 Jan. 15, 2009

(30) Foreign Application Priority Data

Jul. 11, 2007 (KR) .................... 10-2007-0069502
Jan. 4, 2008 (KR) .................... 10-2008-0001494

(51) Int. Cl.
*H04N 1/04* (2006.01)
*H04N 1/46* (2006.01)

(52) U.S. Cl. .................. 358/484; 358/475; 358/474; 358/509; 358/505

(58) Field of Classification Search .............. 358/484, 358/475, 509, 474, 497, 505, 483, 482, 512–514; 250/227.31, 559.07; 362/223, 616; 355/67–70; 399/220, 221
See application file for complete search history.

(56) References Cited

U.S. PATENT DOCUMENTS

| | | | |
|---|---|---|---|
| 5,905,583 A | 5/1999 | Kawai et al. | |
| 6,127,675 A * | 10/2000 | Nakamura et al. | 250/227.31 |
| 6,206,534 B1 * | 3/2001 | Jenkins et al. | 362/600 |
| 6,295,141 B1 | 9/2001 | Ogura et al. | |
| 6,326,602 B1 | 12/2001 | Tabata | |
| 6,360,030 B1 * | 3/2002 | Kawai et al. | 382/312 |
| 6,464,366 B1 * | 10/2002 | Lin et al. | 362/616 |
| 6,512,600 B1 | 1/2003 | Kawai et al. | |
| 6,540,377 B1 * | 4/2003 | Ota et al. | 362/231 |
| 7,071,616 B2 * | 7/2006 | Shimizu et al. | 313/506 |
| 7,538,911 B2 * | 5/2009 | Sakurai et al. | 358/475 |
| 7,548,352 B2 * | 6/2009 | Sakurai et al. | 358/475 |

(Continued)

FOREIGN PATENT DOCUMENTS

EP 0874517 10/1998

(Continued)

OTHER PUBLICATIONS

European Search Report issued in European Application No. EP 08 16 0134.6, mailed Jun. 12, 2009.

(Continued)

*Primary Examiner*—Cheukfan Lee
(74) *Attorney, Agent, or Firm*—Stanzione & Kim, LLP

(57) ABSTRACT

Disclosed are a scanner module and an image scanning apparatus employing the same. The scanner module includes a light source generating light to be irradiated onto an object and a light guide member extending in correspondence with a width of the object. The light guide member has a reflective surface defined by a plurality of reflective grooves, some of which arranged to be non-parallel with other ones. Light is effectively diffused and/or scattered in the width direction of the light guide member by the reflective grooves, allowing a uniform light distribution across the scanning width.

29 Claims, 21 Drawing Sheets

U.S. PATENT DOCUMENTS

| | | | |
|---|---|---|---|
| 2003/0189827 A1 | 10/2003 | Cheng | |
| 2005/0150956 A1 | 7/2005 | Ikeda et al. | |
| 2005/0265684 A1 | 12/2005 | Nemoto et al. | |
| 2006/0165370 A1 | 7/2006 | Nemoto et al. | |
| 2007/0019249 A1 | 1/2007 | Osakabe | |
| 2008/0198427 A1 | 8/2008 | Wang | |
| 2009/0015883 A1* | 1/2009 | Kim | 358/475 |
| 2009/0015886 A1* | 1/2009 | Kim et al. | 358/484 |
| 2009/0218525 A1* | 9/2009 | Ikeda et al. | 250/559.07 |

FOREIGN PATENT DOCUMENTS

| | | | |
|---|---|---|---|
| GB | 1 394 572 | | 5/1975 |
| JP | 02226626 A | * | 9/1990 |
| JP | 06-208066 | | 7/1994 |
| JP | 2002-135533 | | 5/2002 |
| JP | 2003-046735 | | 2/2003 |
| JP | 2004-170858 | | 6/2004 |
| JP | 2006-148956 | | 6/2006 |
| KR | 10-2003-035966 | | 5/2003 |
| KR | 10-2006-023571 | | 3/2006 |

OTHER PUBLICATIONS

English language abstract of JP 06-208066, published Jul. 26, 1994.
Machine English language translation of JP 06-208066, published Jul. 26, 1994.
English language abstract of JP 2003-046735, published Feb. 14, 2003.
Machine English language translation of JP 2003-046735, published Feb. 14, 2003.
European Search Report issued in Application No. 08153746.6 mailed Jul. 30, 2008.
English language abstract of JP 2002-135533, published May 10, 2002.
Machine English language translation of JP 2002-135533, published May 10, 2002.
English language abstract of JP 2004-170858, published Jun. 17, 2004.
Machine English language translation of JP 2004-170858, published Jun. 17, 2004.
English language abstract of KR 10-2003-35966, published May 9, 2003.
English language abstract of JP 2006-148956, published Jun. 8, 2006.
Machine English language translation of JP 2006-148956, published Jun. 8, 2006.
English language abstract of KR 10-2006-23571, published Mar. 14, 2006.
Office Action issued in U.S. Appl. No. 12/170,965, mailed Oct. 26, 2009.

* cited by examiner

SCANNER MODULE AND IMAGE SCANNING APPARATUS EMPLOYING THE SAME This application claims the benefit of Korean Patent Application No. 10-2007-0069502 filed on Jul. 11, 2007 and Korean Patent Application No. 10-2008-0001494 filed on Jan. 4, 2008, the disclosures of both of which are incorporated herein by reference.

BACKGROUND OF THE INVENTION

1. Field of the Invention

The present invention relates to an image scanning apparatus. More particularly, the present invention relates to a scanner module using a light emitting diode as a light source and an image scanning apparatus employing the same.

2. Description of the Related Art

A scanner module may be employed in an image scanning apparatus, e.g., of a scanner, a copy machine, a facsimile, a multi-functional peripheral device, or the like. The scanner module may be placed, e.g., underneath a document window or platen onto which an original document to be scanned is loaded, and converts the image information read from the document into an electric signal.

A scanner module may include, e.g., a light source generating light, an image sensor that produces electrical signal based on the light reflected from the object to be read. A scanner module may also include a reflection mirror and a condenser lens, which may be aligned in an optical path formed between the light source and the image sensor. A linear light source, such as, e.g., a CCFL (cold cathode fluorescent lamp) or a xenon lamp has been used as the light source in some legacy scanner modules.

However, a CCFL may require a long initial start-up time, which may result in longer time to perform an initial scanning operation. In addition, since the CCFL may contain mercury (Hg), which may have adverse impact on the environment. Further, gas activation rate may be lower, possibly degrading image quality, at lower temperatures. A xenon lamp may generate high-temperature heat, which may degrade the image quality, and can be expensive, resulting in the price competitiveness of the scanner module to suffer.

Recently, there have been suggestions for the use of a point light source, such as a light emitting diode, along with a light guide to serve the role of a linear light source by allowing the light from the point light source to be diffused and/or directed along the scanning width, e.g., across the width of the document or object to be scanned.

As shown in FIG. 1, a light guide member 2 employed in a scanning module may have a predetermined width in the image scan direction and a predetermined length in the sub-scan direction (i.e., direction substantially perpendicular to the image scan direction). The light guide member 2 may also include an exit surface 2a facing the object to be scanned, a reflective surface 2b formed on the opposite end of the exit surface 2a to reflect and diffuse the light generated from a light source 1, and guide surfaces 2c formed on both sides of the light guide member 2 to connect the exit surface 2a to the reflective surface 2b. The guide surfaces 2c may be inclined relative to the reflective surface 2b such that the light reflected from the reflective surface 2b can be directed toward the exit surface 2a of the light guide member 2.

As shown in FIG. 2, the reflective surface 2b of the light guide member 2 may include a plurality of reflective grooves 2d, which extend widthwise, parallel to each other, along the light guide member 2, so that the light generated from the light source 1 may be reflected and diffused by the reflective surface 2b, and then may be guided toward the exit surface 2a of the light guide member 2. FIG. 3 shows an example of a distribution of light, which is irradiated onto the surface of a document to be scanned from the light guide member 2, across the image scan direction. As illustrated in FIG. 3, unfortunately, when a point light source and light guide structures shown in FIGS. 1 and 2 result in the light distribution to be non-uniform, making it difficult to accurately read the object being scanned.

SUMMARY OF THE INVENTION

Accordingly, it is an aspect of the present invention to provide a scanner module having a light guide member capable of forming substantially uniform light distribution across the scanning width and an image scanning apparatus employing the same.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF SEVERAL EMBODIMENTS

Figure 1:
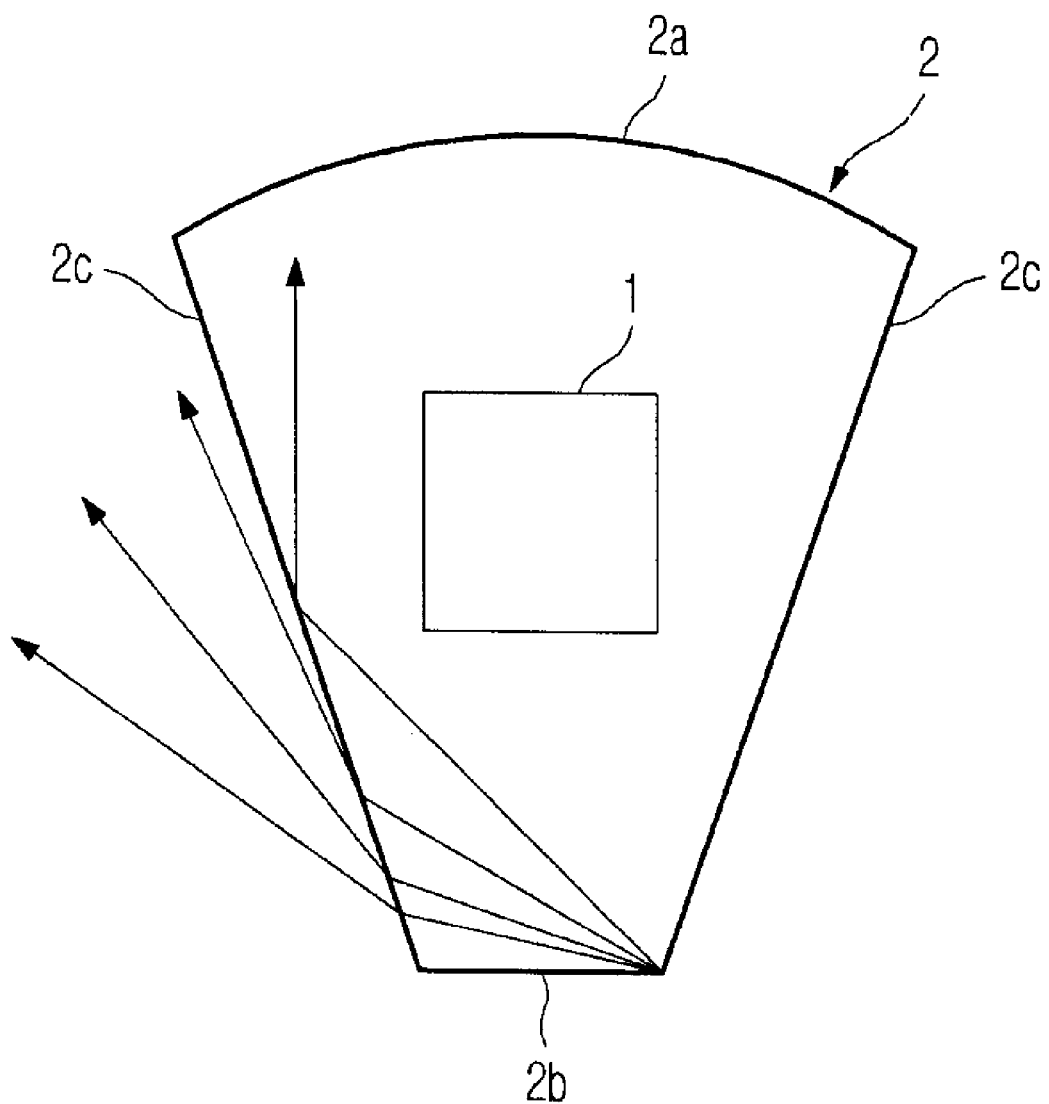
FIG. 1 is a sectional view of a light guide member employed in a conventional image scanning apparatus.
Figure 2:
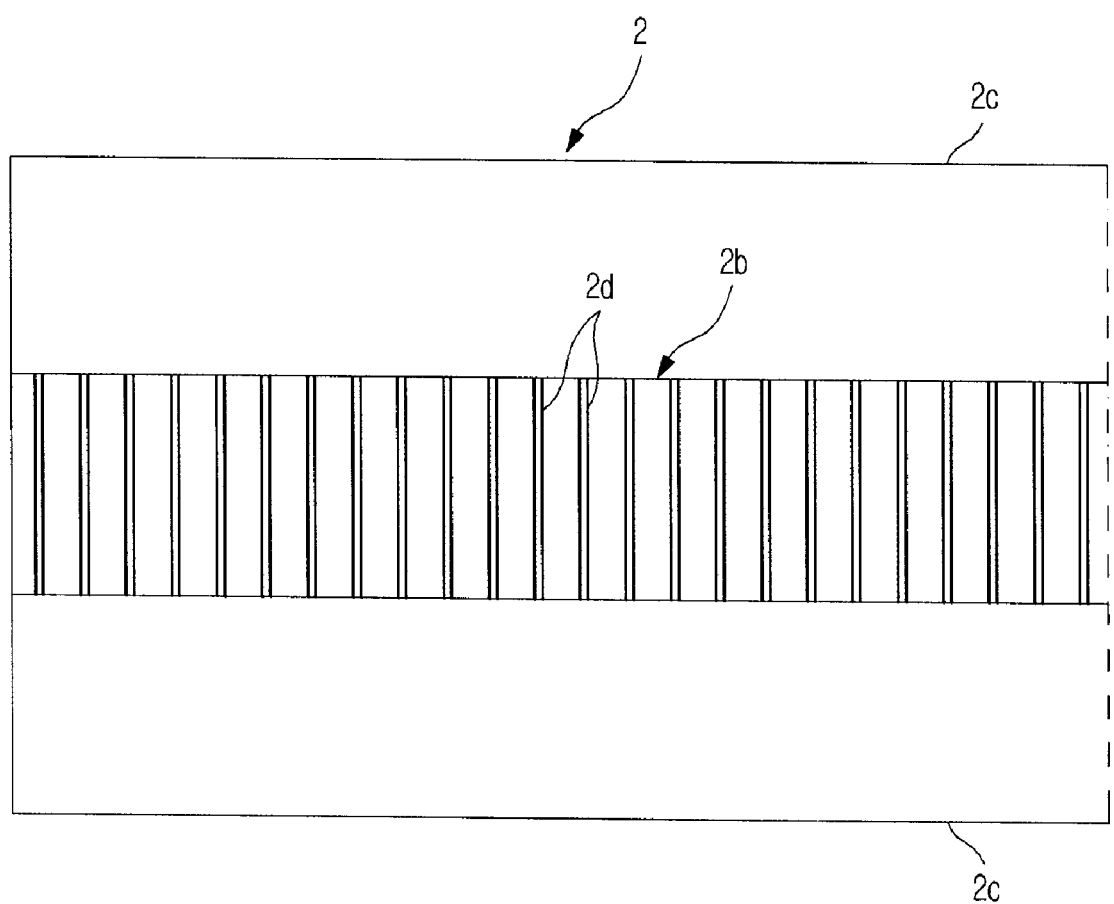
FIG. 2 is a schematic plan view showing a reflective surface of a light guide member employed in a conventional image scanning apparatus.

Reference will now be made in detail to the embodiments of the present invention, examples of which are illustrated in the accompanying drawings, wherein like reference numerals refer to the like elements.

Figure 4:
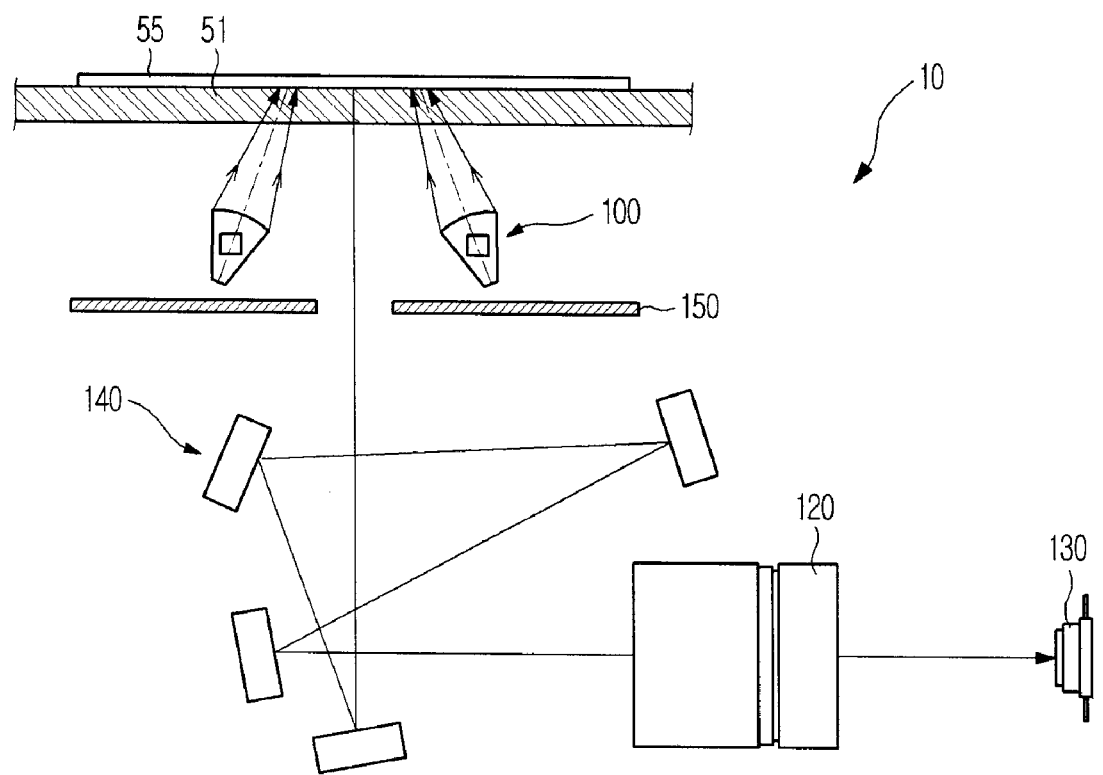
FIG. 4 is a schematic view showing a scanner module employed in an image scanning apparatus according to an embodiment of the present invention.

FIG. 4 is a schematic view illustrating an optical arrangement of a scanner module 10 according to an embodiment. Referring to FIG. 4, a scanner module 10 according to this embodiment may include an illumination device 100 that irradiates light onto an object 55 placed on the manuscript board 51, an image sensor 130, which receives the light reflected from the object 55, and which converts the light into electric signals, a plurality of reflection mirrors 140, which direct the light reflected from the object 55 toward the image sensor 130, and a focus lens 120 arranged in front of the image sensor 130 in the optical path such that the light can be focused on the image sensor 130.

Among the above elements of the scanner module 10, the image sensor 130 reads image information of the object 55 based on the light that is focused on the image sensor 130 through the focus lens 120. The image sensor 130 can provided with various arrangement of sensing elements according to the desired image scanning application. For example, the image sensor 130 may be arranged in a single row or in a plurality of rows of sensor elements for color image scanning of red/green/blue or red/green/blue/white-black.

According to an embodiment, a plurality of reflecting mirrors 140 may be provided between the object 55 and the focus lens 120. The plurality of reflecting mirrors 140 reflect light from the object 55, to change the direction in which the light travels, thereby allowing a predetermined optical path in a limited space. While, for illustrative purposes, four reflecting mirrors 140 are shown in FIG. 4, one skilled in the art will appreciate that the number of reflecting mirrors 140 can be varied without departing from the scope of the disclosure.

The scanner module 10 may further include a light aperture or window 150 to regulate the light traveling toward the image sensor 130. To this end, the light window 150 is disposed between the illumination device 100 and the reflection mirrors 140 to prevent undesired light from reaching the image sensor 130.

Figure 5:
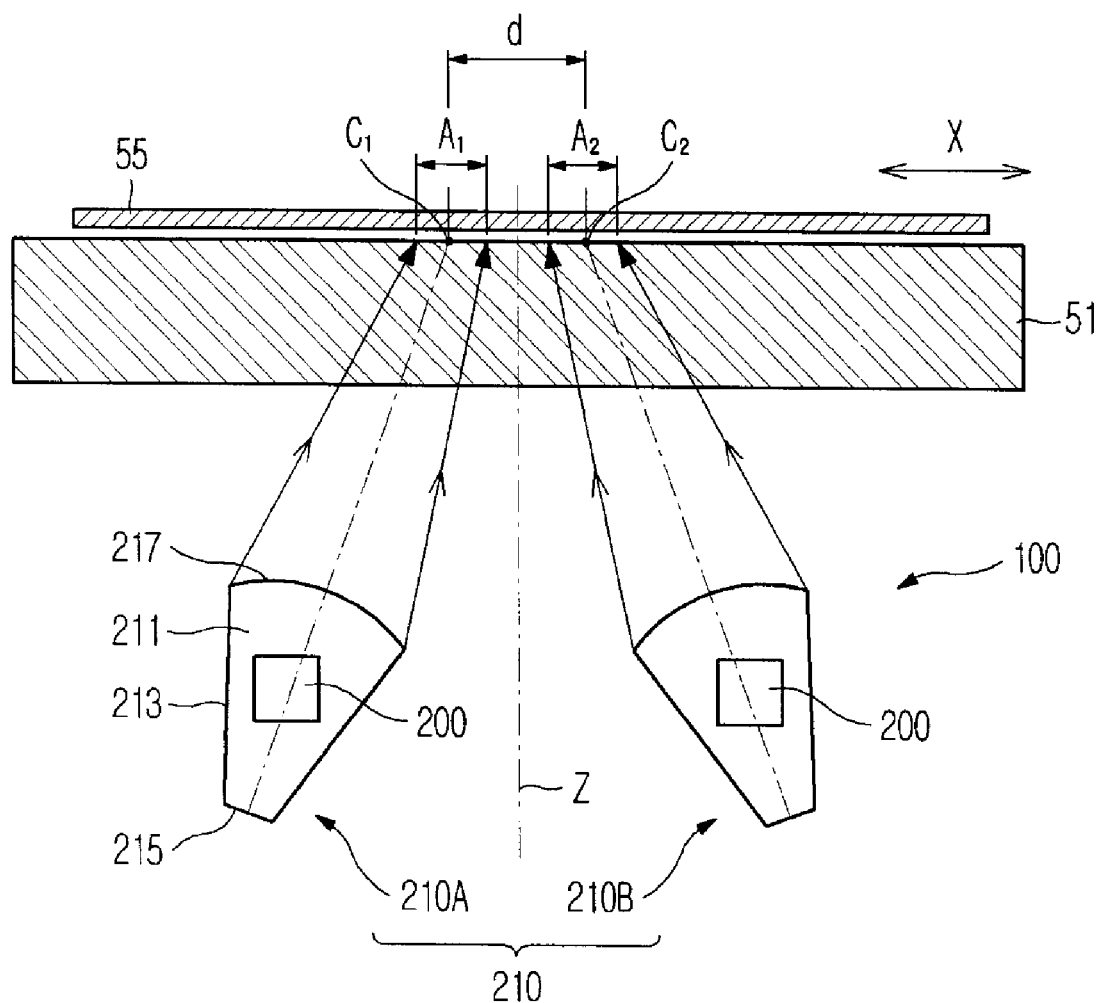
FIG. 5 is a schematic view showing an illumination device employed in an image scanning apparatus according to an embodiment of the present invention.
Figure 6:
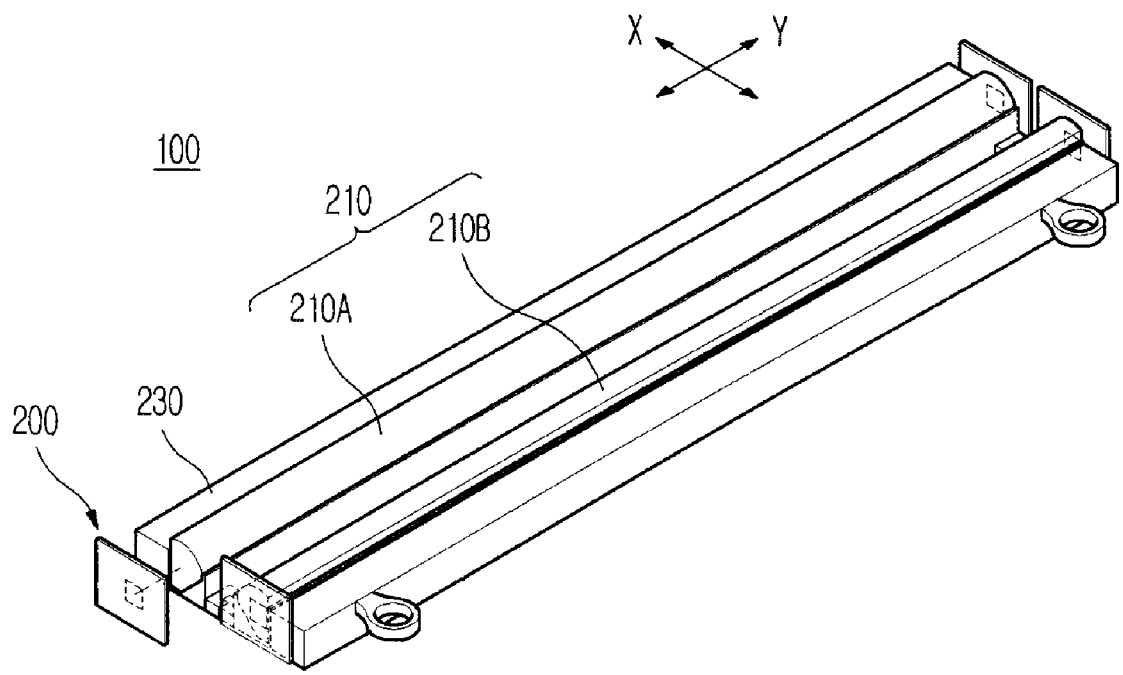
FIG. 6 is a perspective view showing an illumination device employed in an image scanning apparatus according to an embodiment of the present invention.

FIG. 5 is a schematic view illustrating an optical arrangement of an illuminator of a scanner module according to an embodiment, and FIG. 6 is a perspective view of the illuminator of FIG. 5.

Figure 8:
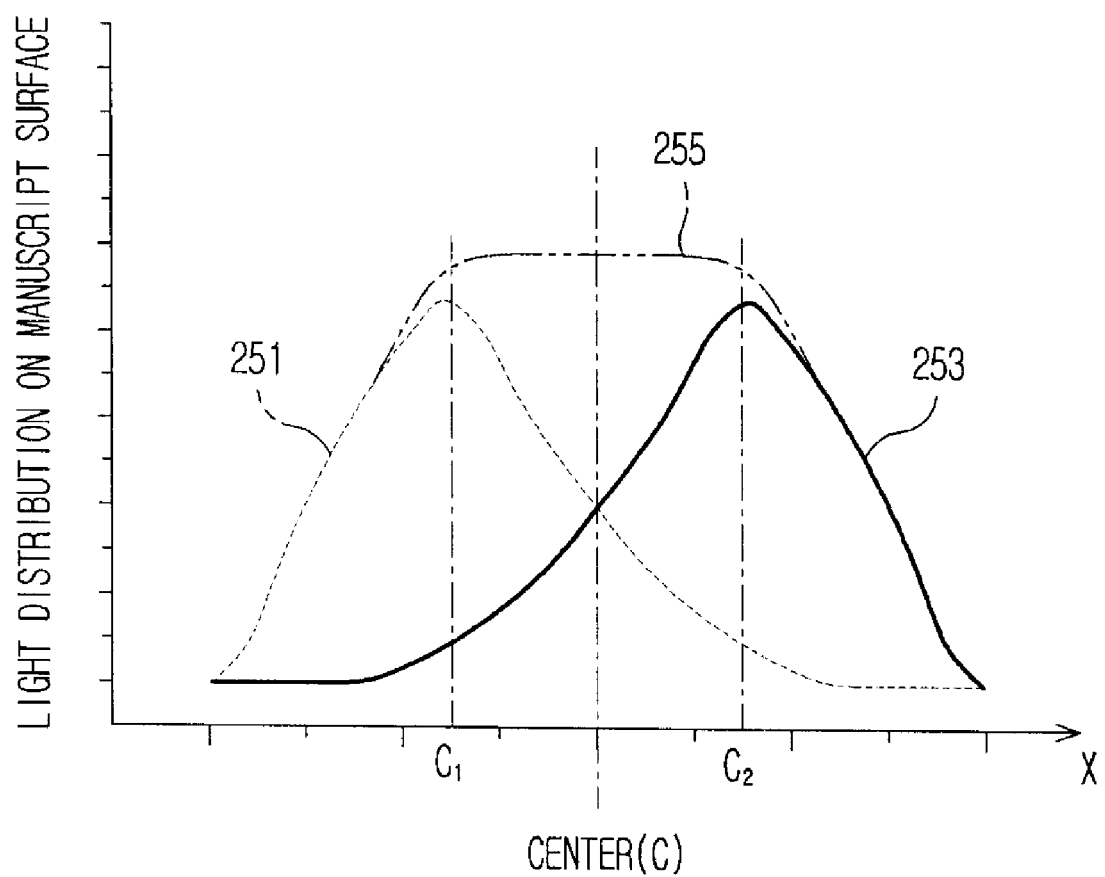
FIG. 8 is a graph showing light distribution on the surface of a manuscript in the width direction of the light guide member employed in an image scanning apparatus according to an embodiment of the present invention.

Referring to FIGS. 5 and 6, the illuminator 100 illuminates the document or manuscript board 51 by sending light along a sub-scanning direction (see the Y-direction in FIG. 8). This sub-scanning direction is substantially perpendicular to an image scanning direction (X-direction) of the scanner module. The illuminator may include a light source 200 emitting light, and a light guide unit 210 extending lengthwise in the sub-scanning direction Y and facing the manuscript board 51.

The light guide unit 210 guides the light toward the object 55 by diffusing the light from the light source 200. The light guide unit 210 includes a pair of light guide members 210A and 210B facing the manuscript board 51, and each extend longitudinally along the sub-scan direction (Y-direction as shown in FIG. 6) defining the lengths of the light guide units while along the image scan direction (X-direction) the widths of the light guide units 210 are defined.

According to an embodiment, the light source 200 may include light emitting diodes capable of emitting light having a wavelength band of three primary colors, namely, red, green and blue. The light emitting diodes may be semiconductor devices, an may be capable of generating a sufficient amount of light within a relatively short period of time in comparison to a CCFL or the xenon lamp. Thus, the start-up time of the scanner module 10 can be shortened and power consumption can be reduced. For example, when a light emitting diode is used as the light source according to an embodiment of the present invention, since the light emitting diode, which is a semiconductor device, may achieve the peak amount of light output within in a short period of time, e.g., 1 $\mu$s, the start-up time of the light source may be shorter in comparison with that a light source utilizing a CCFL which may require the start-up time in excess of, e.g., 30 seconds.

Moreover, a light emitting diode may also be advantageous as a light source over a CCFL as unlike a CCFL that is driven at high voltage, e.g., at several hundreds to thousands of voltages, the semiconductor light source can be driven at a low voltage, obviating the need for the use of inverters used for voltage boosting and AC generation. Thus, the manufacturing cost can be reduced and space utilization can be improved. Also, since the inverters can be omitted, power consumption can be reduced.

Further, while in the case of a CCFL, the amount of light may be reduced at low temperature, the semiconductor light source according to an embodiment of the present invention may be capable of relatively stable light output over wider temperature range. In addition, a semiconductor light source may also reduce the amount of the electromagnetic waves, which may be a source of noise for internal circuits. Further, the semiconductor light source of an embodiment of the present invention may be more durable as compared with the CCFL which is made from thin glass material.

Furthermore, the light emitting diodes may have longer operating life, e.g. of about hundred thousand hours, as compared to a CCFL. In addition, the light emitting diodes can be fabricated without mercury (Hg) that may present environmental concern.

Although, in the embodiment described above, light emitting diodes capable of emitting light having a wavelength band of three primary colors are used as the light source 200, the scope of the application of the present invention is not so limited. For instance, a white light emitting diode coated with fluorescent material to generate blue color or an ultraviolet ray to generate a white color, can also be used as the light source 200. Further, various types of point light sources other than a light emitting diode can alternatively be used as the light source 200.

The light guide members 210A and 210B convert the optical path of light irradiated from the light source 200 such that the light can be irradiated onto at least two regions $A_1$ and $A_2$. The light guide members 210A and 210B are spaced apart from each other in the image scan direction. For the purpose of convenience, the light guide member 210A provided on one side of the image scan direction will be referred to as the first light guide member and the light guide member 210B provided on the other side of the image scan direction will be referred to as the second light guide member. The centers $C_1$ and $C_2$ of the two regions $A_1$ and $A_2$ are spaced apart from each other in the image scan direction X by a distance d. Therefore, the light can be illuminated onto the center C of the object 55 placed on the manuscript board 51 as well as a predetermine region of the object 55 which deviates from the center C of the object 55.

According to the embodiment shown in FIGS. 5 and 6, the illumination device 100 can illuminate the light onto the first and second regions $A_1$ and $A_2$ and a pair of light guide members 210A and 210B are provided to guide the light onto the first and second regions $A_1$ and $A_2$. In addition, the illumination device 100 may further include a holder 230 for guiding the installation position of the light guide members 210A and 210B when the light guide members 210A and 210B are installed in the optical path.

The light guide members 210A and 210B may have elongated shapes extending in the sub-scan direction Y, and may include transparent materials, such as, e.g., PMMA (polymethyl methacrylate). Each of the light guide members 210A and 210B may have an incident surface 211, a guide surface 213, a reflective surface 215 and an exit surface 217.

The light from the light source 200 is incident onto the incident surface 211. The incident surface 211 is formed on at least one longitudinal end portion of the light guide members 210A and 210B and the light source 200 faces the incident surface 211.

Figure 7:
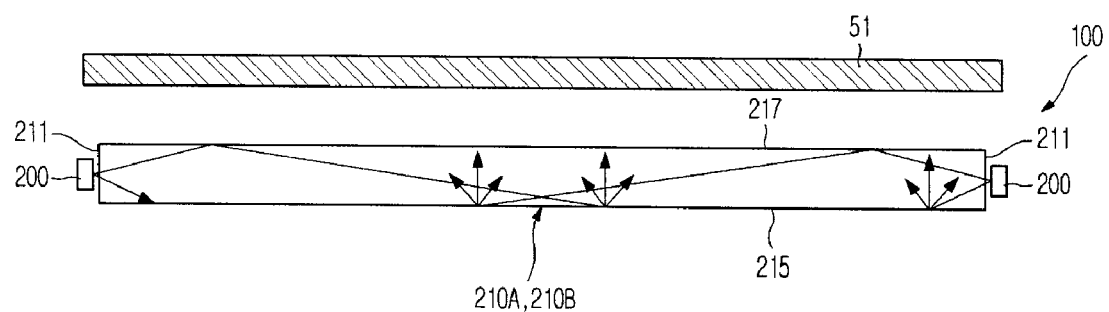
FIG. 7 is a sectional view of the illumination shown in FIG. 6.

For example, FIG. 7 shows incident surfaces 211 that are formed on both longitudinal end portions of the light guide members 210A and 210B. Also according to the embodiment shown in FIG. 7, the light sources 200 are provided to correspond to the incident surfaces 211 formed on both longitudinal end portions of the light guide members 210A and 210B to irradiate light to the incident surfaces 211, thereby increasing the amount of light in the illuminator 100.

The light guide members 210A and 210B, when installed in the holder 230, are slantingly arranged such that the light reflected from the object 55 does not interfere with the light guide members 210A and 210B. That is, as shown in FIG. 5, the central line of light that is output from the light guide members 210A and 210B is inclined relative to a central optical axis Z of the light.

FIG. 8 is a graph showing light distribution on a surface of a document to be scanned in the width direction of the light guide members 210A and 210B when the light source and the light guide members 210A and 210B are arranged as shown in FIG. 5.

Referring to FIG. 8, reference numeral 251 represents a light distribution curve on the surface of the manuscript placed on the manuscript board 51 when the light is output from the first light guide member 210A, and reference numeral 253 represents a curve showing light distribution on the manuscript board 51 when the light is output from the second light guide member 210B. In addition, reference numeral 255 represents a curve showing the total light distribution on the manuscript board 51.

Referring again to FIG. 5, when the light sources 200 and the light guide members 210A and 210B are arranged as shown, the amount of light irradiated onto the manuscript board 51 is maximized at the center $C_1$ of the first region $A_1$ and at the center $C_2$ of the second region $A_2$. As previously mentioned, the center $C_1$ of the first region $A_1$ is spaced apart from the center $C_2$ of the second region $A_2$ by the distance d. Referring to the curve 255 that is the sum of the curves 251 and 253, the amount of light irradiated onto the first and second regions $A_1$ and $A_2$ is substantially constant in the region between the center $C_1$ of the first region $A_1$ and the center $C_2$ of the second region $A_2$.

The illumination device 100 having the above structure can illuminate light over a relatively large region of the manuscript as compared with the conventional illumination device. Thus, the illumination device 100 can be employed in the scanner module 10 capable of performing color scanning operation, and the optical elements constituting the scanner module 10 may have a relatively large assembling tolerance, so that productivity of the scanner module 10 can be improved.

The scanner module 10 according to an embodiment employs the illumination device 100 capable of illuminating light over the relatively large region of the manuscript, so that the output value of the image sensor 130 may remain uniform despite possible deviations in positioning of the reflection mirrors 140 and the focus lens 120 during assembly of the illumination device 100.

The exit surface 217 faces the manuscript board 51. The light that is diffused and reflected by the reflective surface 215 and the guide surface 213 may be output through the exit surface 217. The exit surface 217 may function as a condenser lens that focuses the light on the manuscript board 51, so that light illuminated in the first region $A_1$ may have a Gaussian distribution. According to the present embodiment, as shown in FIG. 5, the exit surface 217 is provided as a convex lens having an arc-shape section with a predetermined curvature.

The reflective surface 215 is disposed in opposition to the exit surface 217 so as to diffuse and reflect the light incident through the incident surface 211, thereby allowing the light to be uniformly output through the entire surface of the exit surface 217. To this end, the light is preferably subject to scattered reflection over the entire area of the reflective surface 215.

Figure 9:
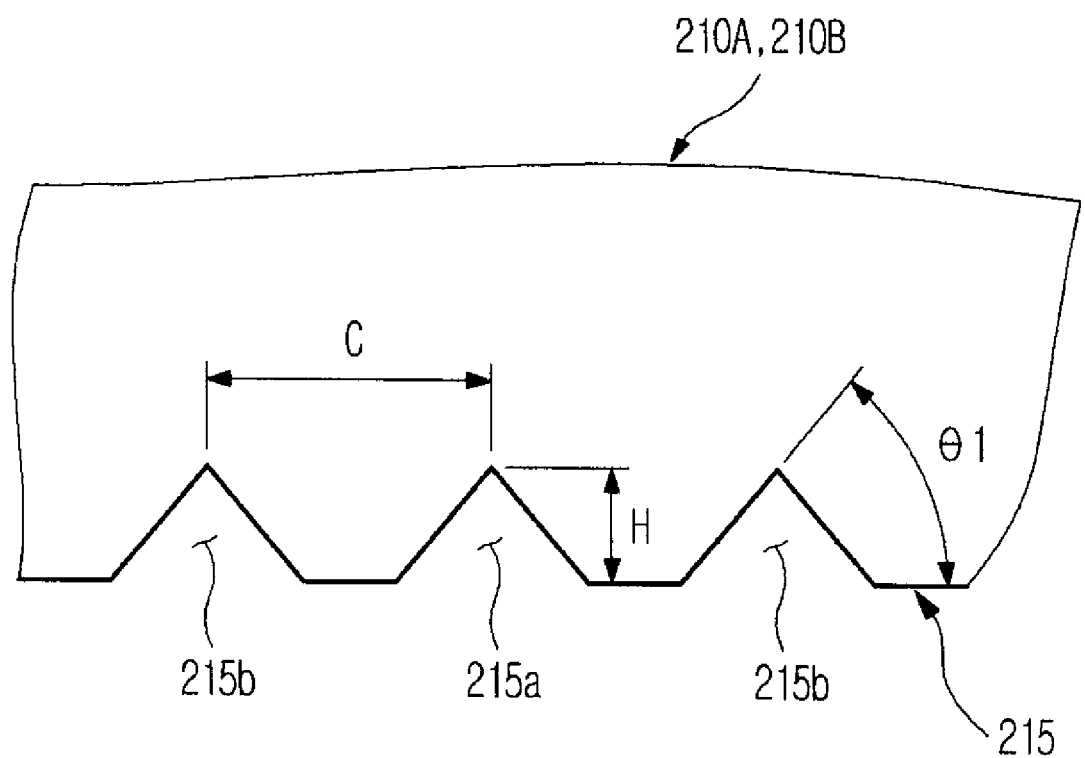
FIG. 9 is a sectional view of a reflective surface of a light guide member employed in an image scanning apparatus according to an embodiment of the present invention.

According to an embodiment, and as shown in FIG. 9, the reflective surface 215 may be formed with a plurality of reflective grooves 215a and 215b so that the light from the light source 200 is subject to a scattered reflection. According to an embodiment, the reflective grooves 215a and 215b may have triangular sectional shapes to guide the light received from the light source 200 through the incident surface 211 at longitudinal end portions of the light guide members 210A and 210B toward the exit surface 217 of the light guide members 210A and 210B. The amount of light reflected toward the exit surface 217 of the light guide members 210A and 210B by the reflective grooves 215a and 215b may increase proportionally to the height H of the triangular section of the reflective grooves 215a and 215b and to the inclination angle θ1 of the lateral side of the triangular section. Therefore, the amount of light irradiated from the light guide members 210A and 210B can be adjusted by properly adjusting the height H and the inclination angle θ1 of the triangular section of the reflective grooves 215a and 215b.

Although the above embodiment has been described to be provided with the reflective grooves 215a and 215b formed in the reflective surface 215 having the triangular cross-section, the present invention is not so limited. For instance, the reflective grooves 215a and 215b may also have arc-shaped sections or rectangular-shaped sections.

Figure 10:
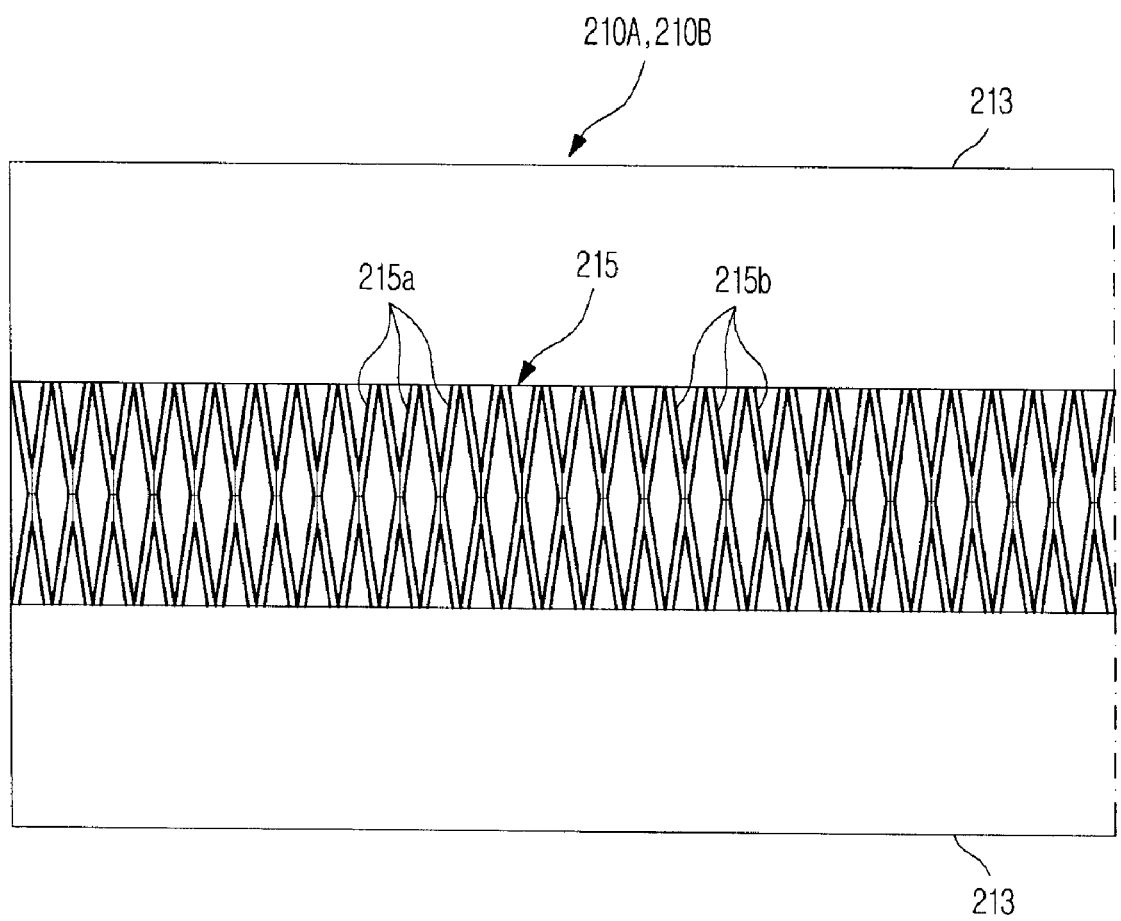
FIG. 10 is a schematic plan view of a reflective surface of a light guide member employed in an image scanning apparatus according to an embodiment of the present invention.

As shown in FIG. 10, the reflective surface 215 of the light guide members 210A and 210B according to an embodiment may be formed with fast and second reflective grooves 215a and 215b, which are symmetrically formed while being inclined along the widths of light guide members 210A and 210B. According to the an embodiment, the first and second reflective grooves 215a and 215b may cross each other on the reflective surface 215.

With the above configuration, the light irradiated from the light source 200 can be guided toward the exit surface 217 of the light guide members 210A and 210B while being diffused in the lateral direction by the first and second reflective grooves 215a and 215b, so that the light can be uniformly distributed in the width direction of the light guide members 210A and 210B when the light is received through the incident surfaces 211 at longitudinal end portions of the light guide members 210A and 210B. As can be understood from the above, the amount of light diffused in the width direction of the light guide members 210A and 210B may increase proportionally to the inclination angle of the first and second reflective grooves 215a and 215b.

Figure 11:
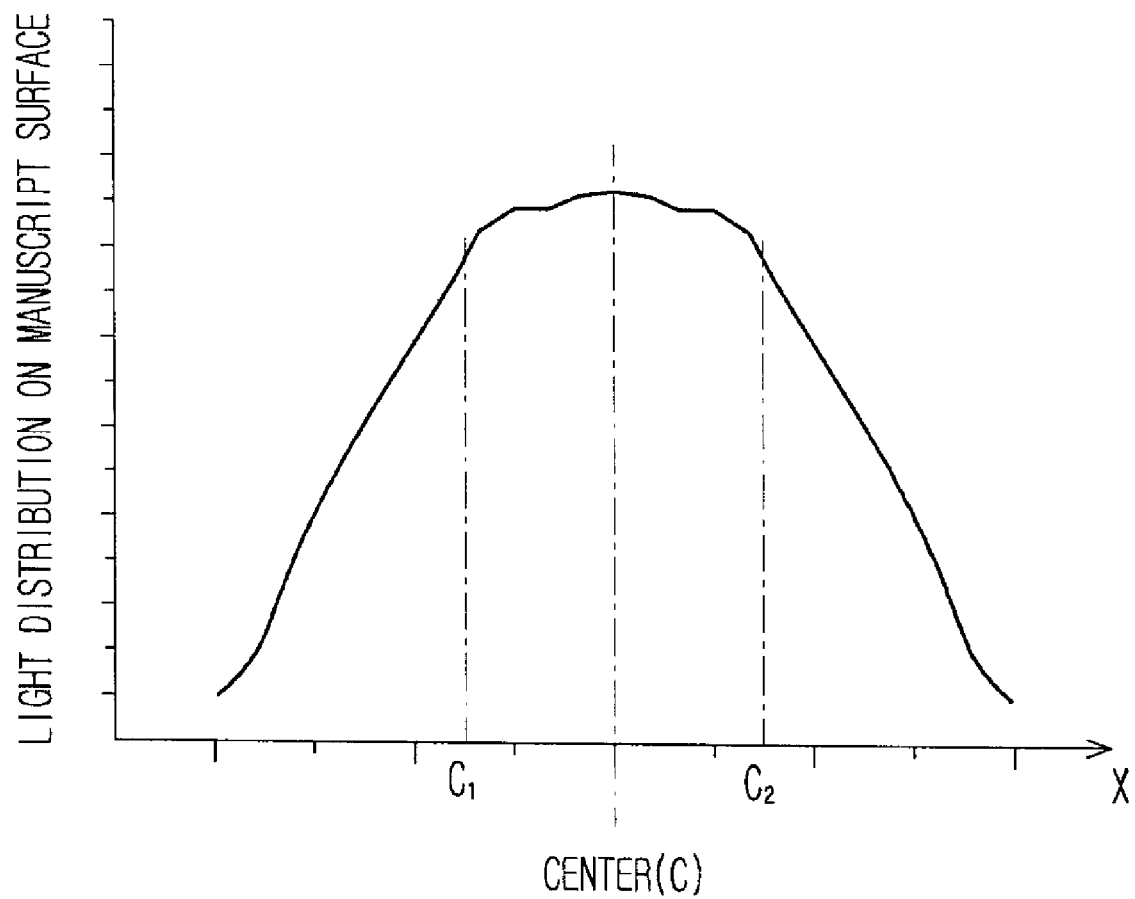
FIG. 11 is a graph showing light distribution on the surface of a manuscript in the width direction of the light guide member employed in an image scanning apparatus according to an embodiment of the present invention.

FIG. 11 is a graph of light distribution curve on across the width of a manuscript board 51 when the light is illuminated with the light guide members 210A and 210B having the first and second reflective grooves 215a and 215b, which are symmetrically patterned while being non-parallel with respect to each other, and when the light irradiated from the longitudinal end portions of the light guide members 210A and 210B is emitted through the exit surface 217.

Figure 3:
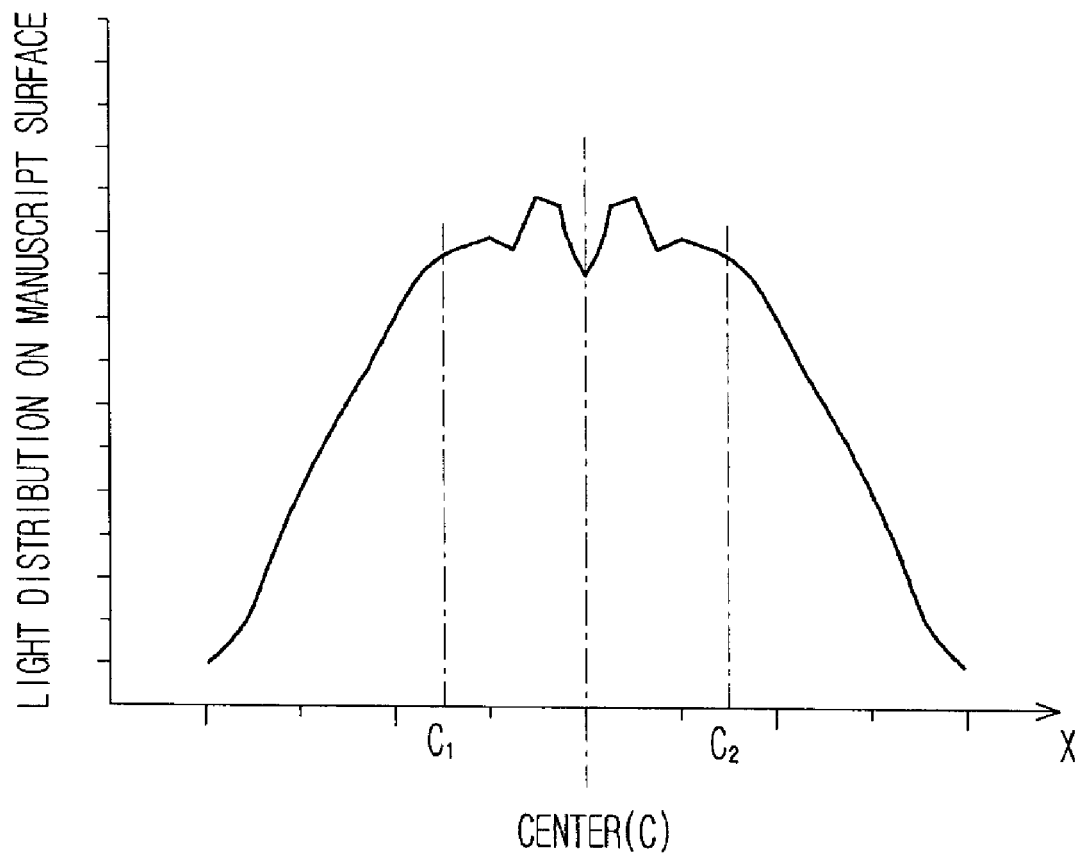
FIG. 3 is a graph showing light distribution along the width of a light guide member in the scanning direction when light is radiated from both longitudinal ends of the light guide member employed in a conventional image scanning apparatus.

Comparing the light distributions illustrated in FIG. 11 with the distribution of FIG. 3, the light guide member 210A or 210B having the first and second reflective grooves 215a and 215b, which extend non-parallel with respect to each other and in relation to the width of the reflective surface 215, and which can effectively diffuse or scatter the light in the width direction of the light guide member 210A and 210B, results in a more uniform light distribution across the manuscript board 51 than the conventional light guide member 1 shown in FIG. 1 having a plurality of reflective grooves 1d, which are formed parallel to each other.

Although the above embodiment has been described as an illustrative example with the reflective surface 215 formed with plural reflective grooves 215a and 215b to allow the light to be subject to scattered reflections, the present invention is not so limited. For instance, the reflective surface 215 may be provided with a micro-lens shape or a cylindrical shape. When the reflective surface 215 has the above configuration, the reflective surface 215 can scatter the incident light, so that the light can be uniformly output through the exit surface 217. In an embodiment, a light diffusion material, such as a white pigment, can be coated on the reflective surface 215 such that light can be uniformly irradiated from the exit surface 217.

Referring again to FIG. 5, the guide surface 213 is formed on both sides of the light guide members 210A and 210b in order to guide the incident light, which is incident into the incident surface 211, such that the incident light can be irradiated through substantially the entire area of the exit surface 217 by internal total reflection.

Figure 12:
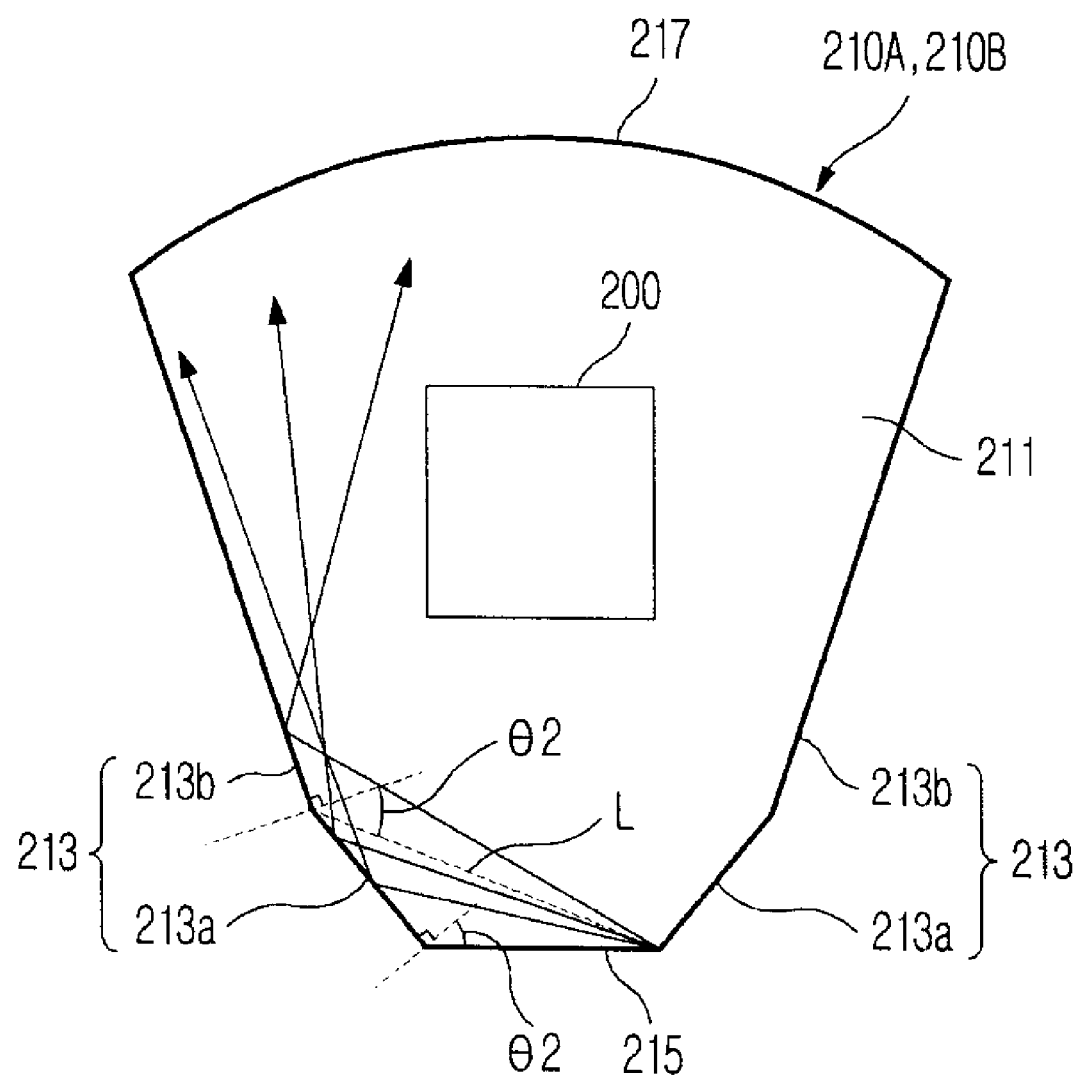
FIG. 12 is a sectional view showing a light guide member according to an embodiment of the present invention.

As shown in FIG. 12, a plurality of guide surfaces 213 are symmetrically formed at both sides of the light guide members 210A and 210b to reflect the light, which is reflected from the reflective surface 215 at various reflection angles, toward the exit surface of the light guide members 210A and 210b. If the plural guide surfaces 213 are symmetrically formed on both sides of the light guide members 210A and 210b, most of the light reflected from the reflective surface 215 may be guided toward the exit surface 217 of the light guide members 210A and 210b while being reflected by the guide surfaces 213, so that the amount of light leaked out of the light guide members 210A and 210b through the guide surfaces 213 can be reduced. As the light reflected from the reflective surface 215 is reflected again by the guide surfaces 213, the guide surfaces 213 may serve as a virtual light source together with the reflective surface 215. Therefore, the light distribution on the surface of the manuscript can be adjusted by properly adjusting the angle of guide surfaces 213 when the light is irradiated through the exit surface 217 of the light guide members 210A and 210b.

According to an embodiment of the present invention, the guide surfaces 213 may include a first guide surface 213a, which extends from both sides of the reflective surface 215 while forming an obtuse angle relative to the reflective surface 215, and a second guide surface 213b, which extends from the first guide surface 213a while forming an obtuse angle relative to the first guide surface 213a.

If the first and second guide surfaces 213a and 213b are formed on both sides of the light guide members 210A and 210b, the light reflected from the reflective surface 215 at a relatively large reflection angle can be reflected toward the exit surface 217 of the light guide members 210A and 210b by the first guide surface 213a, and the light reflected from the reflective surface 215 at a relatively small reflection angle can be reflected toward the exit surface 217 of the light guide members 210A and 210b by the second guide surface 213b, so that the amount of light leaked out of the light guide members 210A and 210b can be reduced.

In order to minimize the light loss, the incident angle of the light incident onto the first and second guide surfaces 213a and 213b from the reflective surface 215 is desirably greater than a critical incident angle $\theta 2$ that ensures total reflection of the light.

In accordance with an embodiment, preferably, the angle between the reflective surface 215 and the first guide surface 213a is equal to or greater than the sum of the critical incident angle $\theta 2$ that ensures total reflection of the light and an angle of 90°. In addition, the angle between the first guide surface 213a and the second guide surface 213b may also be designed such that the incident angle of the light, which is incident onto the second guide surface 213b from the reflective surface 215, may be equal to or greater than the critical incident angle $\theta 2$. Since the minimum incident angle of the light incident on the second guide surface 213b may correspond to an angle between a virtual line L (shown in FIG. 12) and the second guide surface 213b of one side of the light guide member 210A or 210B where the virtual line L extends from the edge serving as the boundary between the reflective surface 215 and the first guide surface 213a on the other side of the light guide member 210A or 210B to an edge serving as a boundary between the first guide surface 213a and the second guide surface 213b of the same side of the light guide member 210A or 210B, the angle between the virtual line L and the second guide surface 213b may preferably be equal to or greater than the sum of the critical incident angle $\theta 2$ and an angle of 90°.

As described above, according to an embodiment, the light guide members 210A and 210B may be formed with polymethyl methacrylate, the critical incident angle $\theta 2$ of which may be 41.8°. Therefore, the angle between the reflective surface 215 and the first guide surface 213a and the angle between the virtual line L and the second guide surface 213b mat be made to be equal to or greater than 131.8°.

According to an embodiment of the present invention, although the angle between the reflective surface 215 and the first guide surface 213*a*, and the angle between the virtual line L and the second guide surface 213*b*, are both described as being equal to or greater than θ2 plus 90°, since the light may be subject to Lambertian reflection at the reflective surface 215, the amount of light incident on the first guide surface 213*a* may be relatively small. Thus, according to another embodiment, the scattering reflection and the uniform light distribution may be achieved by setting only the angle between the virtual line L and the second guide surface 213*b* greater than the sum of the critical incident angle θ2 and an angle of 90°.

According to an embodiment, the light guide members 210A and 210B may be formed with material other than polymethyl methacrylate. For instance, the light guide members 210A and 210B may alternatively formed with colorless transparent resin. The critical incident angle according to the type of resins can be calculated using Snell's law.

Figure 13:
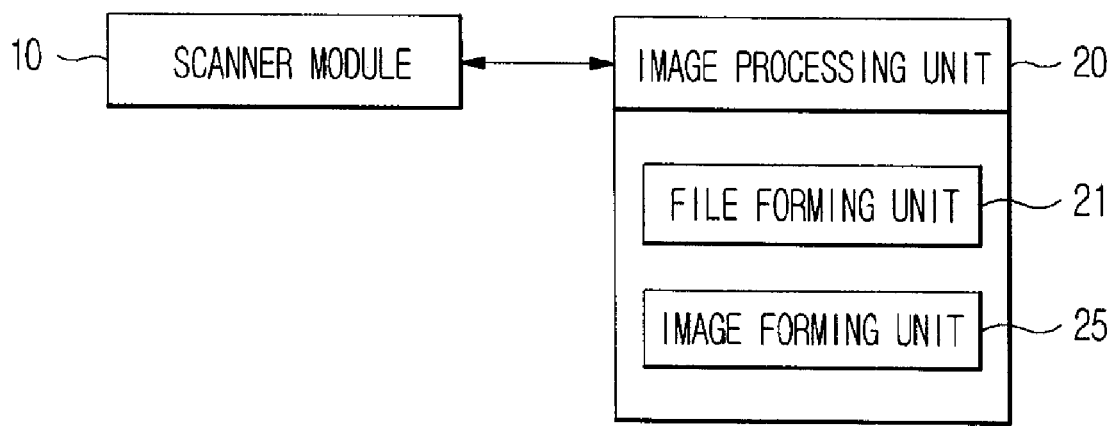
FIG. 13 is a block diagram of an image scanning apparatus according to an embodiment of the present invention.

FIG. 13 is a block diagram of the image scanning apparatus according an embodiment of the present invention. Referring to FIG. 13, the image scanning apparatus according to this embodiment may include the scanner module 10*e* and an image processing unit 20 which processes the image obtained from the scanner module 10. The image scanning apparatus of the present invention may include an MFP (multi-function printer), a copy machine, a facsimile machine, a scanner, or the like.

As various scanner module 10 has already been and will further be described herein. The image processing unit 20 may include at least one of a file forming unit 21 for forming an image file based on the image obtained from the image sensor of the scanner module 10 and an image forming unit 25 for forming an image on a printing medium based on the image obtained from the image sensor. The file forming unit 21 may be a microprocessor, microcontroller or the like, that includes a CPU to execute one or more computer instructions to implement the operation of forming the image files from the image data received from the image sensor of the scanner module 10, and may further include a memory device, e.g., a Random Access Memory (RAM), Read-Only-Memory (ROM), a flesh memory, or the like, to store the one or more computer instructions. The image forming unit may include any of various printing mechanisms, e.g., one utilizing electro-photographic image forming technique, which may include photosensitive member to which latent images are formed, and the latent image of which is developed into a toner image that is transferred and fixed on a printing medium, e.g., a sheet of paper, one that utilizes ink jet technique including an ink jet print head that places tiny ink droplets through nozzles of the print head directly on the paper, or the like.

Accordingly, if the image scanning apparatus employs the scanner module 10 having the illumination device 100 described above, the image sensors aligned in a plurality of rows can output uniform values even if the position of optical elements, such as reflection mirrors, becomes out of alignment by various external parameters.

Although some of the embodiments, such as sown in FIG. 6, are described to include the separate light guide members 210A and 210B that are installed together through the holder 230, the present invention is not so limited. For instance, according to an alternative embodiment, e.g., as shown in FIG. 14, a pair of light guide members 310A and 310B may be extruded as an integral body, e.g., by using a single mold.

Figure 14:
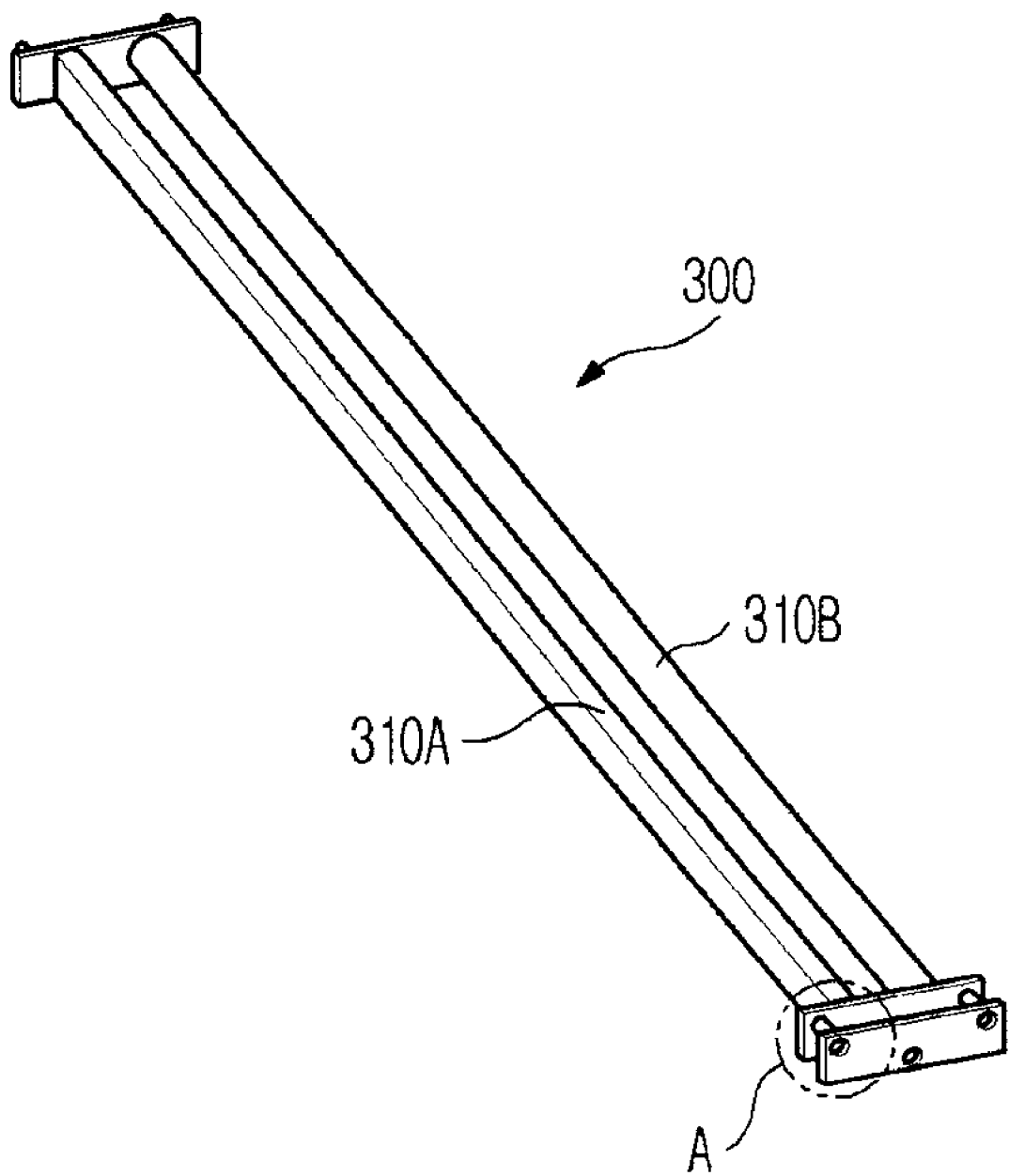
FIG. 14 is a perspective view showing an illumination device employed in an image scanning apparatus according to an embodiment of the present invention.
Figure 15:
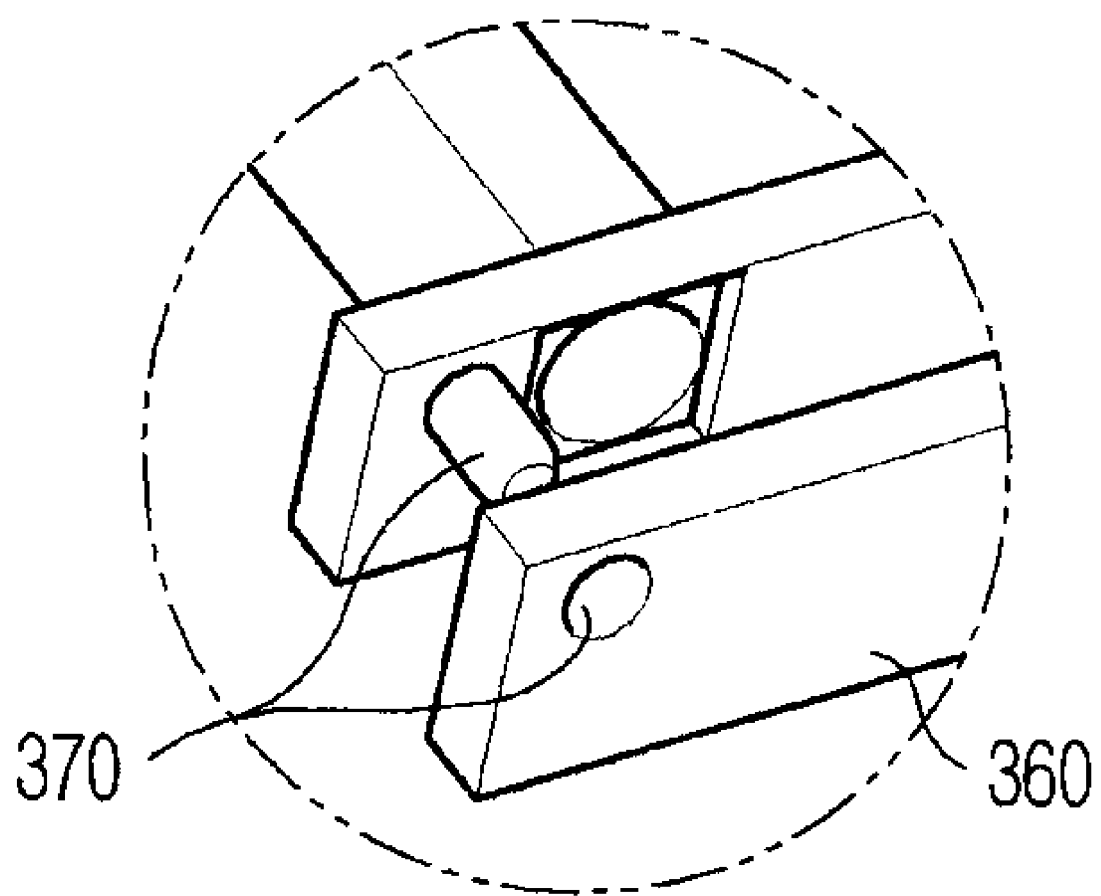
FIG. 15 is an enlarged perspective view of "A" shown in FIG. 14.

FIG. 14 illustrates a structure in which a first light guiding member 310A and a second light guiding member 310B may be connected at opposite ends thereof. As shown, the first light guiding member 310A and the second light guiding member 310A are extruded as an integrally formed body or from the same single mold, e.g., through an injection molding process, and are assembled together. The light source, which irradiates light toward the light guide members 310A and 310B, may also be integrally formed with a single substrate 360. In addition, as shown in FIG. 15, a coupling structure 370 may be provided between the light source substrate 360 and the light guide members 310A and 310B to improve assembling process for the illumination device 100. This extrusion and simultaneous assembly as described above may help to further alleviate the problem of assembling tolerance, simplify assembling work, and decrease production costs.

Figure 16:
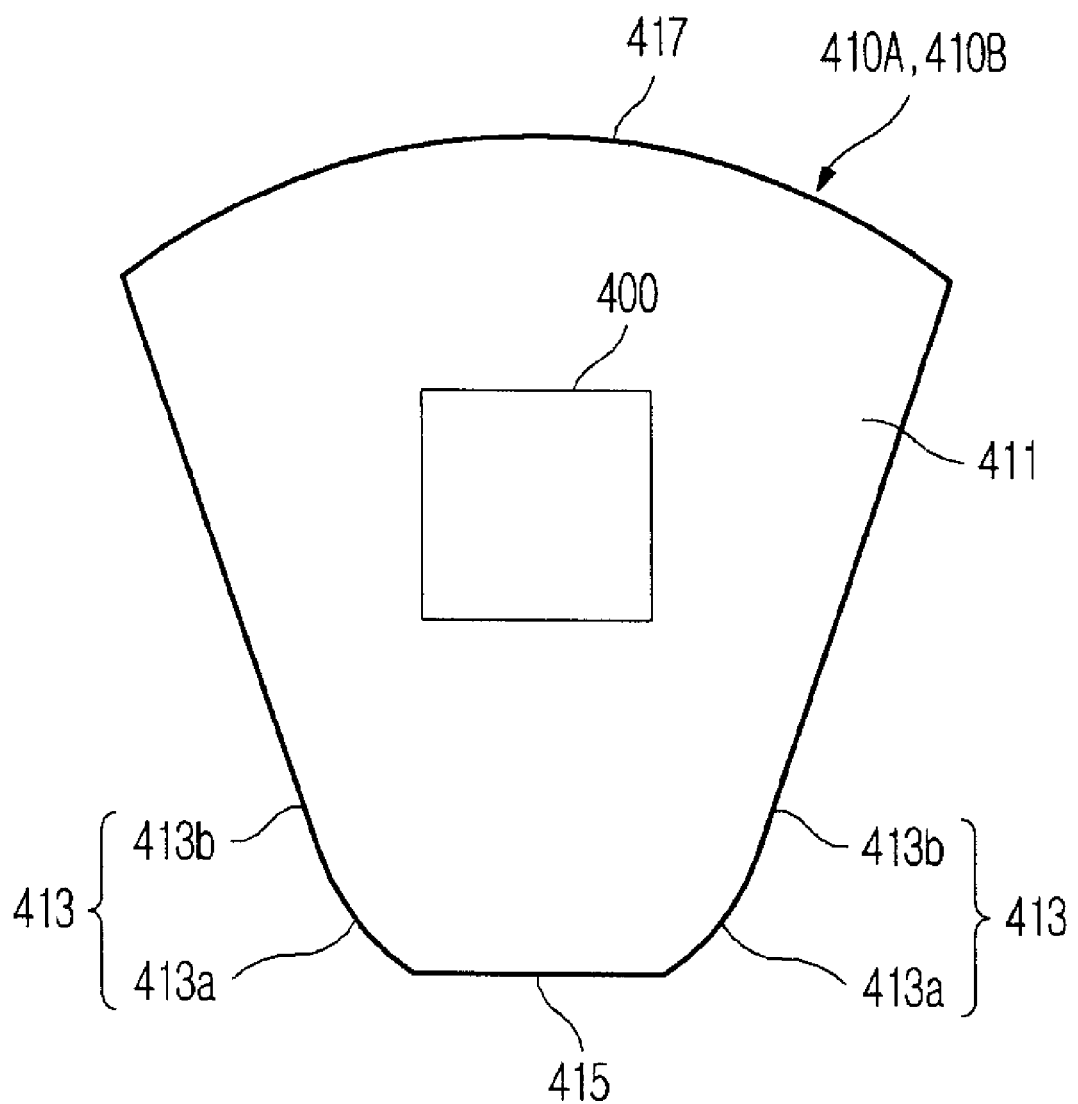
FIG. 16 is a sectional view of a light guide member according to an embodiment of the present invention.

Although the first and second guide surfaces 213*a* and 213*b* are shown in FIG. 12 as having linear cross-sectional shapes, the present invention is not so limited. For instance, according to an alternative embodiment, as, e.g., illustrated in FIG. 16, a first guide surface 413*a* of light guide member 410A and/or 410B may have a curved shape and a second guide surface 413*b* of the light guide members 410A and 410B may have a linear sectional shape.

Figure 17:
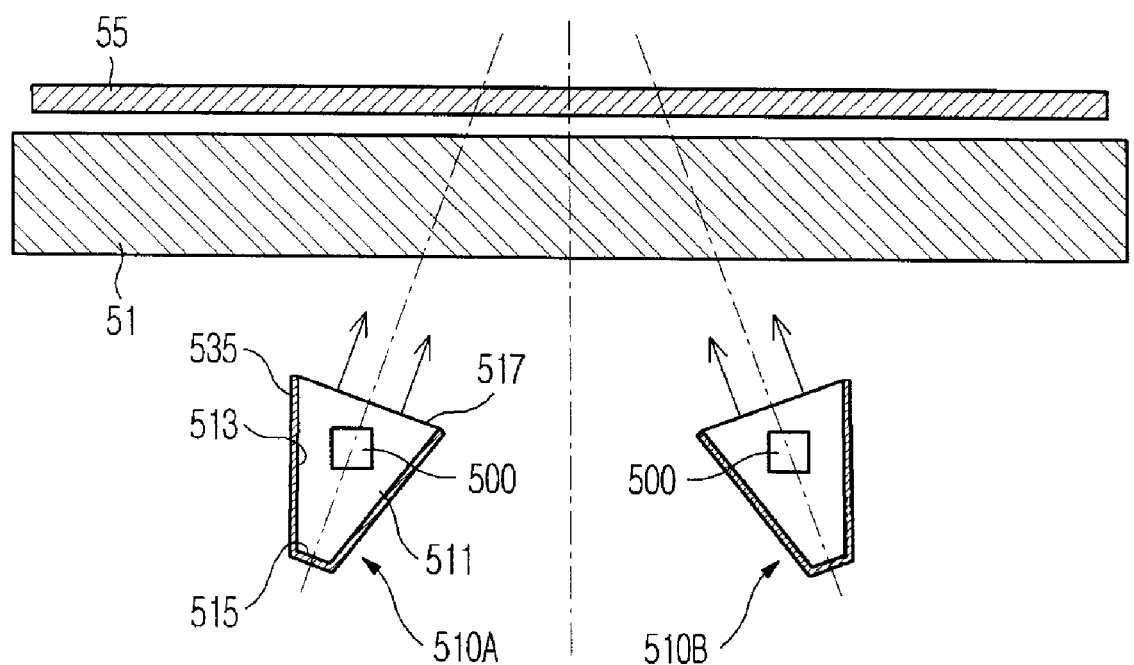
FIG. 17 is a schematic view of an illumination device employed in an image scanning apparatus according to an embodiment of the present invention.

Referring to FIG. 5, while in that figure the scattered reflection is shown and described to occur only at the reflective surface 215 of the light guide members 210A and 210B. However, the present invention is not so limited. For instance, according to another embodiment, as, e.g., shown in FIG. 17, a reflective member 535 is formed on at least one of a reflective surface 515 and a guide surface 513 of light guide members 510A and 510B. Referring to FIG. 17, the reflective member 535 is formed on the guide surface 513 and the reflective surface 515, respectively. The reflective member 535 may be obtained by forming the reflective groove structure on the guide surface 513 or the reflective surface 515 as previously described, or, for example, by coating or printing the guide surface 513 or the reflective surface 515 with a material having high reflectivity of about 90% or more in the wavelength band of the light irradiated from the light source 500. Such material having high reflectivity is generally known in the art, and thus is no described in detailed herein for the sake of brevity.

In addition, although FIG. 5 shows the exit surface 217 in the form of the convex lens having an arcuate shape, the present invention is not so limited. For instance, as shown in FIG. 17, the exit surface may be prepared in the form of a flat lens having a plane shape or a Fresnel lens pattern.

Figure 18:
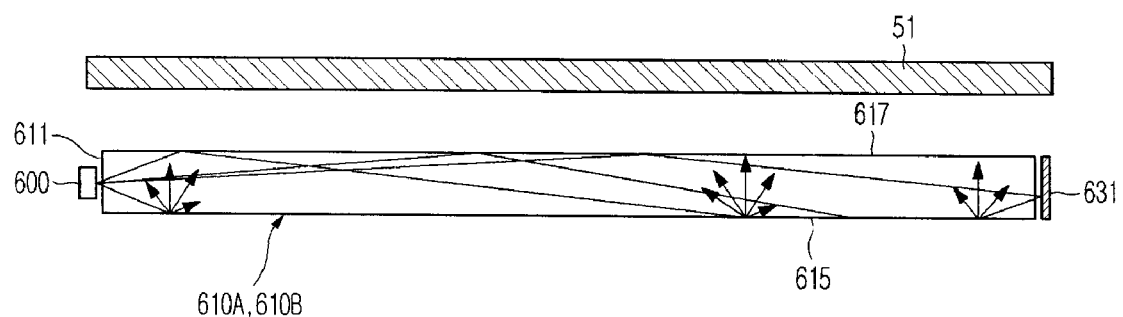
FIG. 18 is a sectional view of an illumination device employed in an image scanning apparatus according to an embodiment of the present invention.

Although FIG. 7 shows the incident surface 211 formed at both longitudinal end portions of the light guide members 210A and 210B, the present invention is not so limited. For instance, according to an embodiment, as shown, e.g., in FIG. 18, a light source 600 may be installed only at one longitudinal end portion of light guide members 610A and/or 610B, so that only one incident surface 611 may be formed on one longitudinal end portion of light guide members 610A and/or 610B. In this case, a reflective plate 631 may be provided at the other longitudinal end portion of light guide members 610A and/or 610B. Thus, the light incident through the incident surface 611 or the reflective surface 615 is reflected into the light guide members 610A and 610B, thereby preventing the light irradiated from the light source 600 from being output through other surfaces.

Figure 19:
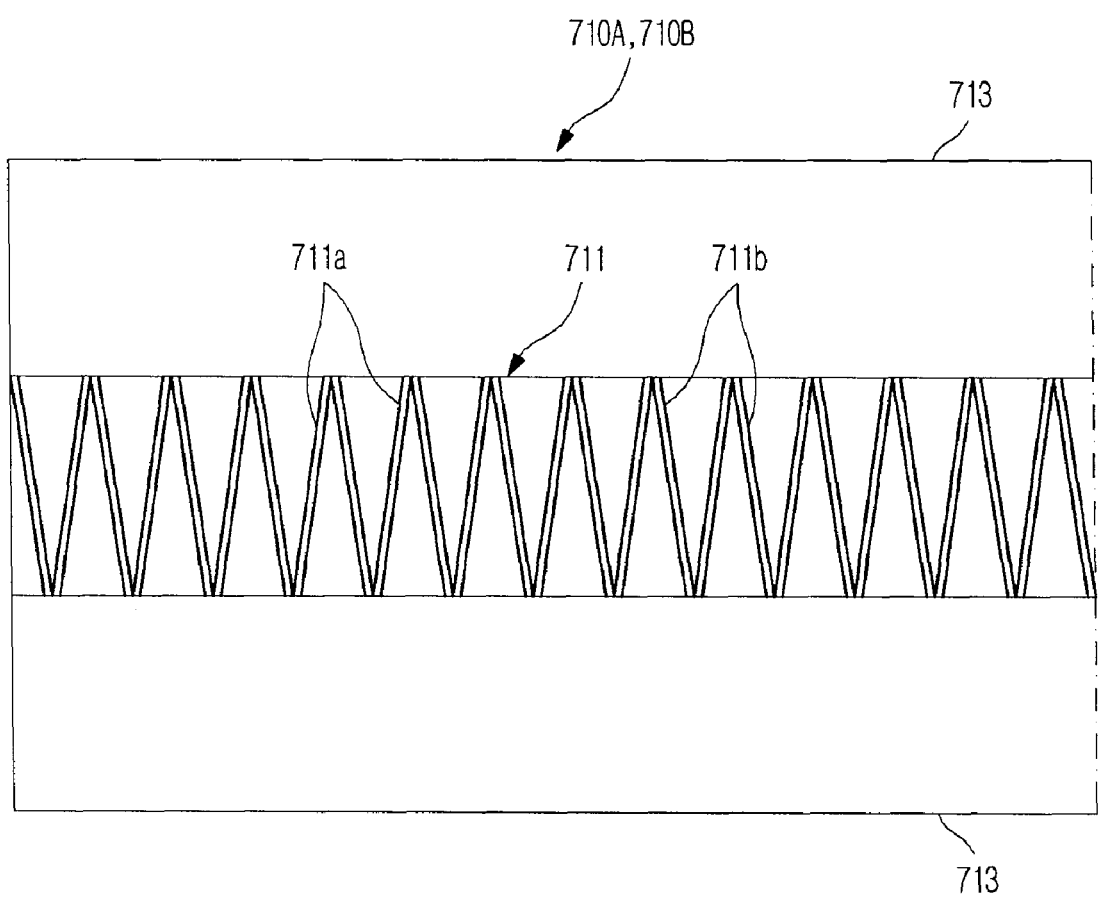
FIG. 19 is a plan view of a light guide member employed in an image scanning apparatus according to an embodiment of the present invention.

In addition, although FIG. 10 shows the first and second reflective grooves 215*a* and 215*b* that cross each other as one possible illustrative pattern thereof, the present invention is not so limited. For instance, according to an embodiment as shown, e.g., in FIG. 19, first and second reflective grooves 711*a* and 711*b* of a reflective surface 711 may be patterned not to cross each other, but are alternately arranged along the light guide members 710A and 710B, achieving the same beneficial aspects contemplated by the present disclosure.

Figure 20:
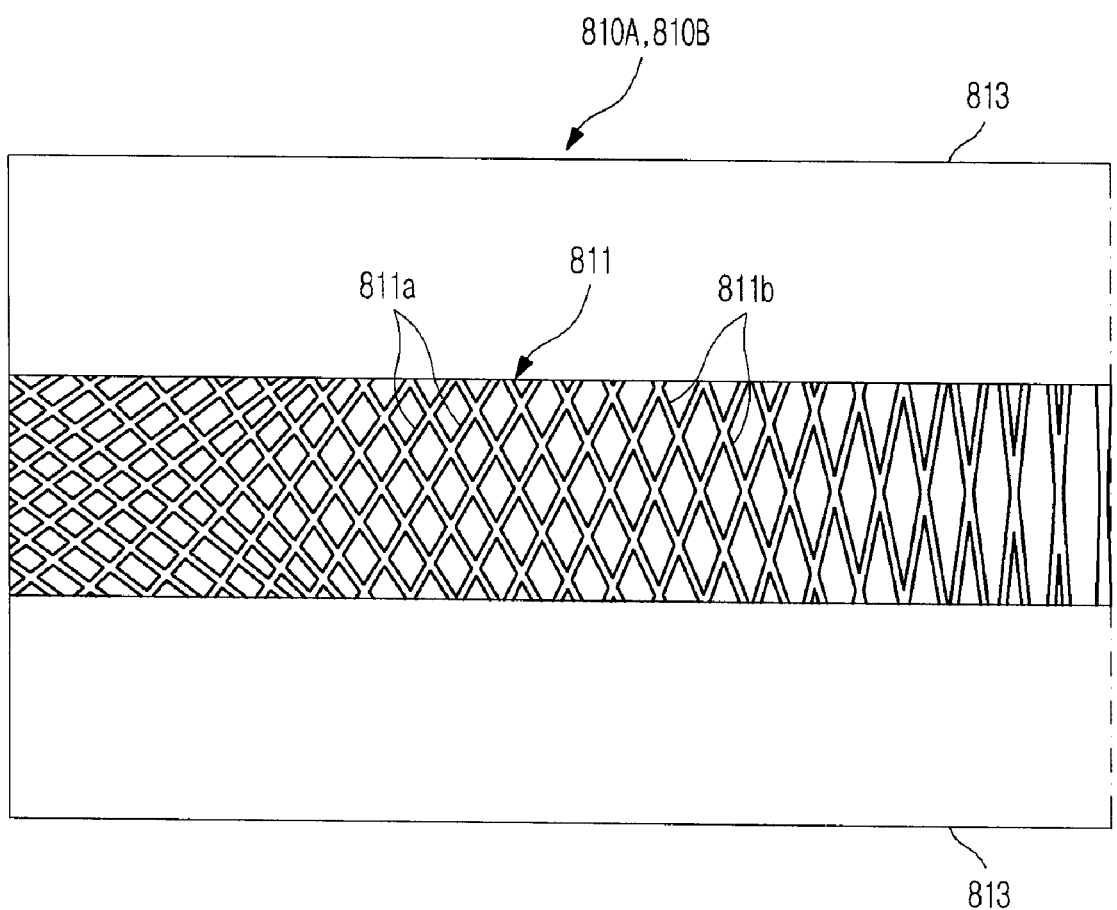
FIG. 20 is a plan view of a light guide member employed in an image scanning apparatus according to an embodiment of the present invention.

While according to the embodiment thus far described, the first and second reflective grooves 215a and 215b are described to have the same inclination angle across the length of the light guide members. However, the present invention is not so limited. The light distribution on the surface of the manuscript may not be uniform in the width direction of the light guide members 210A and 210B at the vicinity of the longitudinal end portions of the light guide members 210A and 210B. Thus, according to an alternative embodiment, as shown, e.g., in FIG. 20, the inclination angle of first and second reflective grooves 811a and 811b formed in a reflective surface 811 may gradually increase from the center towards the ends of light guide members 810A and 810B. In this case, light can be effectively diffused even at the end portions of the light guide members 810A and 810B.

In addition, the amount of light radiated from the both longitudinal ends of the light guide members 810A and 810B may increase proportionally to the inclination angle of the first and second reflective grooves 811a and 811b formed in the light guide members 810A and 810B. Therefore, if the inclination angle of the first and second reflective grooves 811a and 811b is gradually increased from the center towards the ends of light guide members 810A and 810B as described above, the amount of light irradiated onto the object 55 from the both longitudinal ends of the light guide members 810A and 810B may increase. Thus, there may be a difference between the amount of light irradiated onto the object 55 from the center of the light guide members 810A and 810B and the amount of light irradiated onto the object 55 from the both longitudinal ends of the light guide members 810A and 810B.

Figure 21:
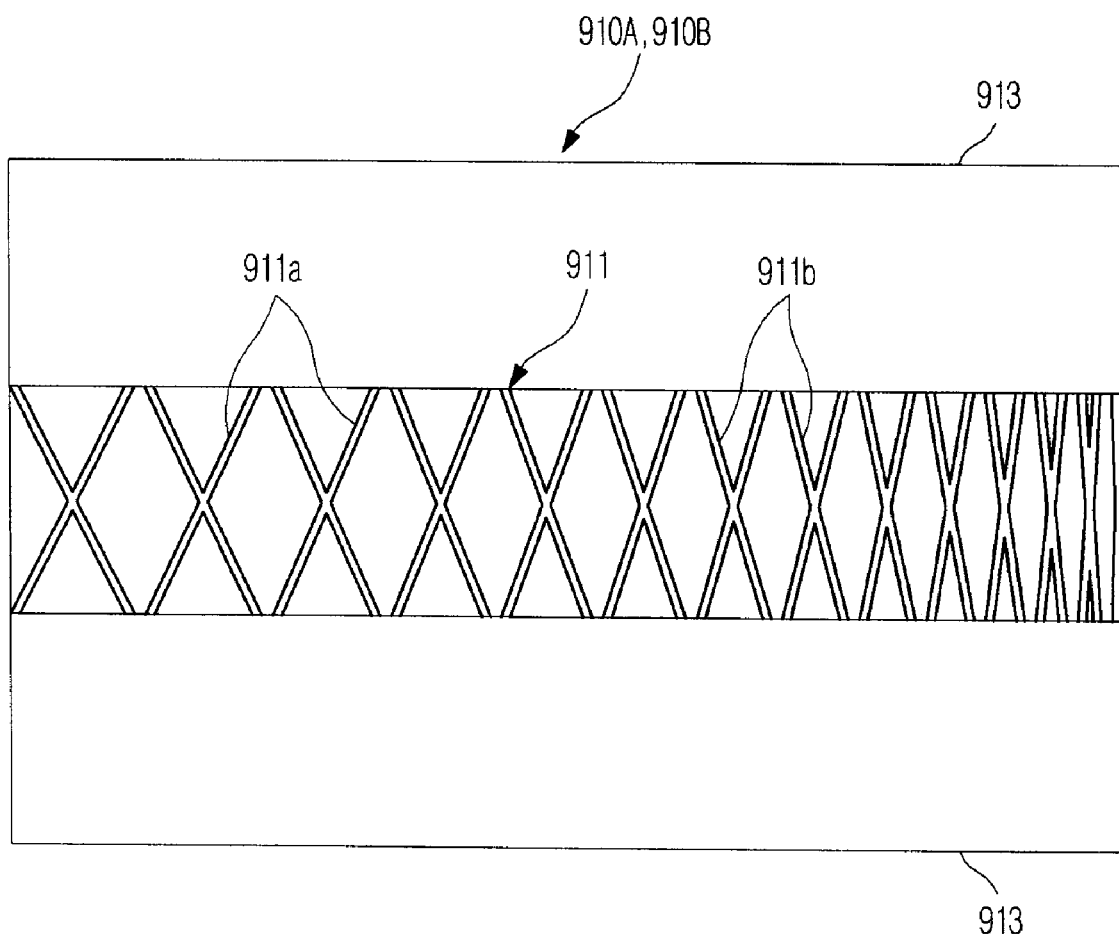
FIG. 21 is a plan view of a light guide member employed in an image scanning apparatus according to an embodiment of the present invention.

In order to address the above difference, according to another embodiment of the present invention, as shown, e.g., in FIG. 21, the inclination angle of the first and second reflective grooves 911a and 911b gradually increases from the center to the both ends of light guide members 910A and 910B, and at the same time, the interval between the first and second reflective grooves 911a and 911b increases proportionally to the inclination angle of the first and second reflective grooves 911a and 911b. In this case, the amount of light radiated onto the object from the both longitudinal ends of the light guide members 910A and 910B may be reduced, so the difference between the amount of light irradiated onto the object 55 from the center of the light guide members 910A and 910B and the amount of light irradiated onto the object 55 from the both longitudinal ends of the light guide members 910A and 910B can be reduced.

While various embodiments have been described in relation to a CCDM, in which the light source and the plural reflection mirrors are integrated in a single module, the present invention can also be applied to an MMT (mirror moving type), in which one light source and one reflection mirror are integrated in a single module and two reflection mirrors are integrated in another single module such that the modules including the mirrors can read the image while moving along the object.

Although few embodiments of the present invention have been shown and described, it would be appreciated by those skilled in the art that changes may be made in these embodiments without departing from the principles and spirit of the invention, the scope of which is defined in the claims and their equivalents.

Finally, it is the applicant's intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

What is claimed is:

1. A scanner module, comprising:
   a light source configured to generate light; and
   a light guide member configured to receive the light from the light source, and to direct the received light toward a document to be scanned, the light guide member having a length and a width, the light source being disposed on at least one longitudinal end of the light guide member,
   wherein the light guide member has a reflective surface facing the document to be scanned, the reflective surface having formed thereon one or more first reflective grooves and one or more second reflective grooves, at least one of the one or more first reflective grooves and at least one of the one or more second reflective grooves being not parallel with respect to each other, and
   wherein the first reflective grooves and the second reflective grooves are inclined with respect to the width direction of the light guide member.

2. The scanner module according to claim 1, wherein the at least one of the one or more first reflective grooves and the at least one of the one or more second reflective grooves cross each other.

3. The scanner module according to claim 1, wherein the first and second reflective grooves are provided in an alternating manner along the length of the light guide member.

4. The scanner module according to claim 1, wherein each of the one or more first reflective grooves and the one or more second reflective grooves is inclined at a corresponding one of one or more incline angles with respect to a center line extending across the width of the light guide member, the center line dividing the reflective surface into two equal halves, and
   wherein the one or more incline angles become progressively larger as moving from the center line towards a longitudinal end of the light guide member.

5. The scanner module according to claim 4, wherein intervals between neighboring ones of the one or more first reflective grooves and the one or more second reflective grooves increase progressively as moving from the center line towards a longitudinal end of the light guide member proportionally to increase in the one or more incline angles.

6. The scanner module according to claim 1, wherein the light source comprises a light emitting diode.

7. The scanner module according to claim 6, wherein the light guide member comprises a pair of light guide members disposed adjacent to each other non-parallel to each other such that both facing the document to be scanned.

8. The scanner module according to claim 7, wherein each light guide member of the pair of light guide members comprises a first incident surface at a first longitudinal end and a second incident surface at a second longitudinal end opposite the first longitudinal end, and
   wherein the light emitting diode comprises a first pair of light emitting diodes fabricated on a first common substrate and a second pair of light emitting diodes fabricated on a second common substrate, the first pair of light emitting diodes being disposed adjacent the first incident surface of both light guide members of the pair of light guide members, the second pair of light emitting diodes being disposed adjacent the second incident surface of both light guide members of the pair of light guide members.

9. The scanner module according to claim 6, wherein the light emitting diode generates light having a wavelength band of three primary colors including red, green and blue colors.

10. The scanner module according to claim 6, wherein the light emitting diode comprises a white light emitting diode that generates a white color, the while light emitting diode being a blue light emitting diode coated with a fluorescent material.

11. The scanner module according to claim 1, wherein each of the one or more first reflective grooves and the one or more second reflective grooves has a triangular cross-sectional shape.

12. The scanner module according to claim 1, wherein each of the one or more first reflective grooves and the one or more second reflective grooves has an arcuate cross-sectional shape.

13. An image scanning apparatus, comprising:
   a scanner module configured to convert a visual image information of a document into an electric signal, the scanner module comprising:
   a light source configured to generate light;
   a light guide member configured to receive the light from the light source, and to direct the received light toward the document to be scanned, the light guide member having a length and a width, the light source being disposed on at least one longitudinal end of the light guide member, the light guide member having a reflective surface facing the document to be scanned, the reflective surface having formed thereon one or more first reflective grooves and one or more second reflective grooves, at least one of the one or more first reflective grooves and at least one of the one or more second reflective grooves being not parallel with respect to each other, wherein the first reflective grooves and the second reflective grooves are inclined with respect to the width direction of the light guide member;
   an image sensor configured to receive a reflected light reflected off the document, and to produce image signal based on the received reflected light; and
   an image processing unit having an input through which to receive the image signal from the image sensor, the image processing unit being configured to produce a data pattern based on the received image signal, the data pattern being representative of the visual image information.

14. The image scanning apparatus according to claim 13, wherein the scanning module further comprises:
   one or more reflecting mirrors disposed in an optical path between the document to be scanned and the image sensor, the one or more reflecting mirrors being configured to direct the reflected light off the document toward the image sensor; and
   a focusing lens disposed between the one or more reflecting mirrors and the image sensor to focus the reflected light redirected by the one or more reflecting mirrors on the image sensor.

15. The image scanning apparatus according to claim 13, wherein each of the one or more first reflective grooves and the one or more second reflective grooves being inclined at a corresponding one of one or more incline angles with respect to a center line extending across the width of the light guide member, the center line dividing the reflective surface into two equal halves, and
   wherein the one or more incline angles become progressively larger as moving from the center line towards a longitudinal end of the light guide member.

16. The image scanning apparatus according to claim 15, wherein intervals between neighboring ones of the one or more first reflective grooves and the one or more second reflective grooves increase progressively as moving from the center line towards a longitudinal end of the light guide member proportionally to increase in the one or more incline angles.

17. The image scanning apparatus according to claim 13, wherein the light source comprises a light emitting diode.

18. The image scanning apparatus according to claim 17, wherein the light guide member comprises a pair of light guide members disposed adjacent to each other non-parallel to each other such that both facing the document to be scanned,
   wherein each light guide member of the pair of light guide members comprises a first incident surface at a first longitudinal end and a second incident surface at a second longitudinal end opposite the first longitudinal end, and
   wherein the light emitting diode comprises a first pair of light emitting diodes fabricated on a first common substrate and a second pair of light emitting diodes fabricated on a second common substrate, the first pair of light emitting diodes being disposed adjacent the first incident surface of both light guide members of the pair of light guide members, the second pair of light emitting diodes being disposed adjacent the second incident surface of both light guide members of the pair of light guide members.

19. The image scanning apparatus according to claim 17, wherein the light emitting diode generates light having a wavelength band of three primary colors including red, green and blue colors.

20. The image scanning apparatus according to claim 17, wherein the light emitting diode comprises a white light emitting diode that generates a white color, the while light emitting diode being a blue light emitting diode coated with a fluorescent material.

21. The image scanning apparatus according to claim 13, wherein each of the one or more first reflective grooves and the one or more second reflective grooves has a triangular cross-sectional shape.

22. A light guide member having a length and a width for use in an image scanning apparatus for reading a visual image of a document, comprising:
   one or more incident surfaces configured to receive light from a point light source, the one or more incident light surface being provided at least one longitudinal end of the light guide member;
   an exit surface facing the document to be scanned, the exit surface defining a top surface of, and extending along the length of, the light guide member;
   a reflective surface disposed at a bottom of the light guide member, the reflective surface being configured to reflect the light received through the one or more incident surfaces; and
   one or more light guide surfaces extending between the reflective surface and the exit surface, the one or more light guide surface being configured to reflect the light reflected by the reflective surface toward the exit surface,
   wherein the reflective surface has formed thereon one or more first reflective grooves and one or more second reflective grooves, at least one of the one or more first reflective grooves and at least one of the one or more second reflective grooves being not parallel with respect to each other, and
   wherein the first reflective grooves and the second reflective grooves are inclined with respect to the width direction of the light guide member.

23. The light guide member according to claim 22, wherein each of the one or more first reflective grooves and the one or more second reflective grooves is inclined at a corresponding one of one or more incline angles with respect to a center line extending across the width of the light guide member, the center line dividing the reflective surface into two equal halves, the one or more incline angles becoming progressively larger as moving from the center line towards a longitudinal end of the light guide member.

24. The light guide member according to claim 23, wherein intervals between neighboring ones of the one or more first reflective grooves and the one or more second reflective grooves increase progressively as moving from the center line towards a longitudinal end of the light guide member proportionally to increase in the one or more incline angles.

25. The light guide member according to claim 22, wherein each of the one or more first reflective grooves and the one or more second reflective grooves has a triangular cross-sectional shape.

26. The light guide member according to claim 22, wherein the exit surface has an arcuate shape.

27. The light guide member according to claim 22, wherein the exit surface has a Fresnel lens pattern.

28. The light guide member according to claim 22, wherein each of the one or more light guide surfaces comprises a first guide surface and a second guide surface, the first guide surface extending between the reflective surface and the second guide surface, the second guide surface extending between the first guide surface and the exit surface, the reflective surface and the first guide surface defining a first obtuse angle therebetween, the first guide surface and the second guide surface defining a second obtuse angle therebetween, and wherein at least one of the first obtuse angle and the second obtuse angle is greater than or equal to a sum of 90° and a critical incident angle, the critical incident angle being dependent on a material with which the light guide member is made, and being an angle at which substantially all of light incident is reflected.

29. The light guide member according to claim 28, wherein the light guide member is made from polymethyl methacrylate material, the critical incident angle being 41.8°.

* * * * *